Sept. 4, 1956 C. ARNE 2,761,467
FLOAT GAUGE
Original Filed Oct. 8, 1947
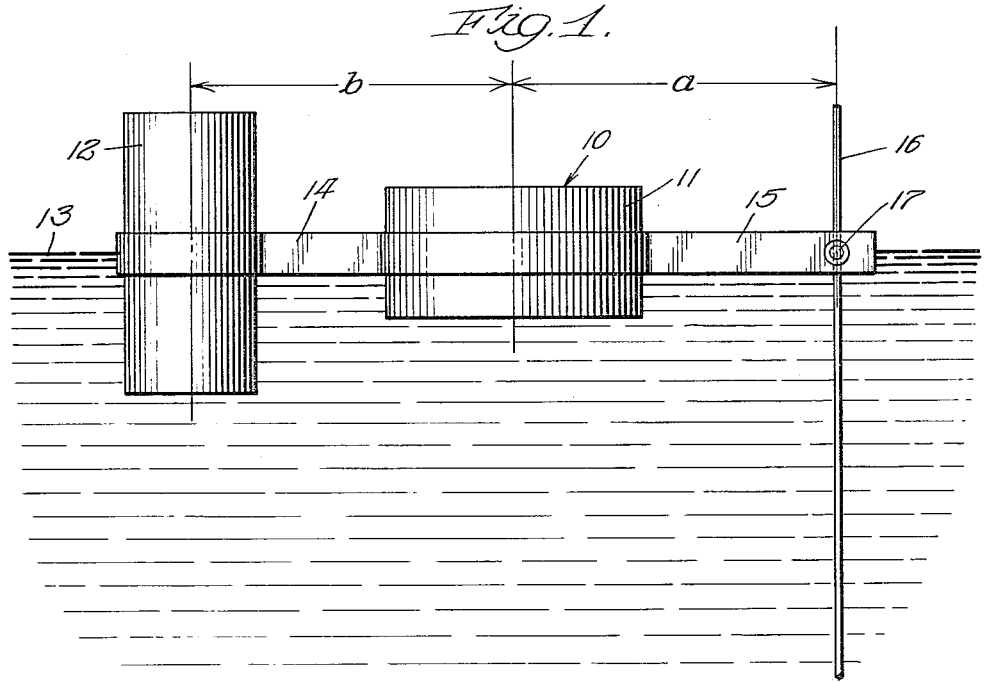
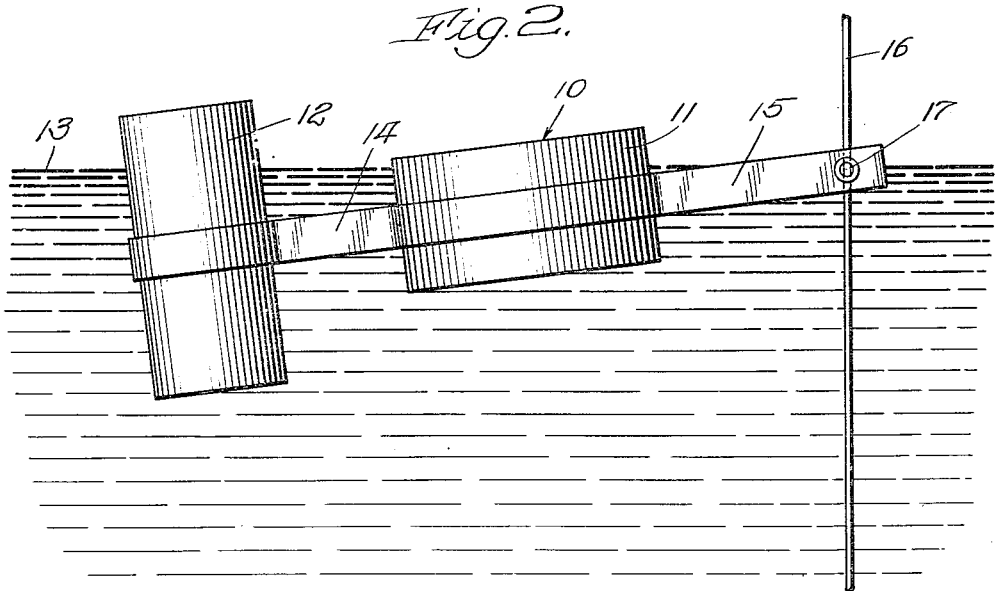
Inventor:
Christian Arne,
By Schroeder, Merriam,
Holgren & Brady, Attys.

United States Patent Office 2,761,467
Patented Sept. 4, 1956

2,761,467
FLOAT GAUGE

Christian Arne, Chicago, Ill., assignor to Chicago Bridge & Iron Company, Chicago, Ill.

Original application October 8, 1947, Serial No. 778,621, now Patent No. 2,678,060, dated May 11, 1954. Divided and this application June 6, 1952, Serial No. 292,182

2 Claims. (Cl. 137—452)

This invention relates to a float and more particularly to a float adapted to be used in conjunction with a gauge for measuring the height of a contained liquid.

This is a divisional application of my pending application Serial No. 778,621, filed October 8, 1947, entitled "Float Gauge," on which Patent No. 2,678,060 issued May 11, 1954.

The level of a contained liquid is customarily measured by means of a gauge float floating on the surface of the liquid to which is attached a calibrated tape leading to a measuring device for indicating the height of the liquid. Such gauge floats, while functioning efficiently under normal conditions, give completely inaccurate readings when the specific gravity of the contained liquid changes. For example, such floats cannot be used with any degree of accuracy in measuring the height of contained liquids in lock gates in tidal waters where the salt content of the liquid changes with the tide. Problems also arise in measuring the height of liquids stored in tanks where the type of liquid stored varies from time to time.

I have invented a gauge float which will maintain at least a portion of itself in a constant position relative to the surface of a stored liquid regardless of the specific gravity of the liquid and regardless of changes in specific gravity of the liquid.

The invention will be described with reference to a preferred embodiment illustrated in the accompanying drawing in which Figs. 1 and 2 are vertical sections through a float of the invention showing its operation in liquids of differing specific gravity.

The float, generally indicated 10, comprises a first float body 11 and a second float body 12, both partially immersed in a contained liquid 13. The float bodies are of equal weight in air and a connecting member 14 connects the float bodies together in spaced relationship and has and extension 15 extending beyond the float 11. A gauge tape 16 is connected to the extension 15 at point 17. The horizontal cross-sectional area of the floats 11 and 12 are inversely proportional to the respective distances from their centers to the point 17. In the particular embodiment shown the distance $a$ is equal to the distance $b$ so that the center of float 12 is twice the distance from the point 17 as is the center of the float 11. Therefore, the horizontal cross-sectional area of the float 11 is twice that of the float 12. These proportions may be varied as desired, for example, if the distance $b$ is twice that of $a$ the cross-sectional area of the float 11 will be triple that of the float 12, assuming the floats to be of equal weight. As the specific gravity of the liquid changes, for example reduces, both floats tend to sink lower in the liquid. As the float 12 has but one-half the cross-sectional area of the float 11 it will sink double the distance and therefore the entire float will pivot about the point 17 leaving that point precisely at the liquid level of the contained liquid. The operation of the device is illustrated in Figs. 1 and 2 from which it can be seen that the point 17 remains at the surface of the contained liquid regardless of the degree of submergence of the gauge float.

Where the floats 11 and 12 are of unequal weight, their respective distances from the point 17 will be directly proportional to their depths of flotation, that is, to the quotients of weight divided by the cross-sectional area.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. A gauge float having at least a portion adapted to float at a constant position relative to the surface of a stored liquid regardless of the specific gravity of the liquid comprising a first float body, a second float body, a member rigidly connecting the second float to the first float and extending a finite distance beyond the first float, said float bodies being positioned on said member at distances from one end of said member proportional directly as the quotients of their weights in air divided by their horizontal cross-sectional areas whereby said member will pivot about said one end with sinking of the floats with a reduction in the specific gravity of the stored liquid.

2. The gauge float of claim 1 in which the floats are cylinders of equal density and in which said distances from said point differ inversely as the cross-sectional areas of said floats.

References Cited in the file of this patent

UNITED STATES PATENTS 2,110,490   Renner _____ Mar. 8, 1938